(12) United States Patent
Brockhoff et al.

(10) Patent No.: US 8,733,823 B2
(45) Date of Patent: May 27, 2014

(54) BUMPER SYSTEM FOR A MOTOR VEHICLE AND METHOD FOR ENERGY DISSIPATION IN THE EVENT OF A HEAD-ON COLLISION

(75) Inventors: Franz Ulrich Brockhoff, Bramsche (DE); Stefan Grottke, Rheine (DE); Stefan Schmitz, Bielefeld (DE); Holger Diersmann, Westerkappeln (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/600,700

(22) Filed: Aug. 31, 2012

(65) Prior Publication Data

US 2013/0234456 A1  Sep. 12, 2013

(30) Foreign Application Priority Data

Aug. 31, 2011  (DE) .......................... 10 2011 053 158

(51) Int. Cl.
*B62D 25/08* (2006.01)
*B60R 19/34* (2006.01)

(52) U.S. Cl.
USPC ................... 296/187.1; 296/187.09; 293/154; 293/133

(58) Field of Classification Search
USPC ........... 296/187.09, 187.1; 293/154, 132, 133
See application file for complete search history.

(56) References Cited

U.S. PATENT DOCUMENTS

| 3,506,295 | A | * | 4/1970 | Yancey .......................... 293/133 |
| 3,666,310 | A | * | 5/1972 | Burgess et al. ............... 293/109 |
| 3,702,202 | A | | 11/1972 | Rumsey |
| 3,820,834 | A | | 6/1974 | Wilfert et al. |
| 5,056,840 | A | * | 10/1991 | Eipper et al. ................... 293/120 |
| 2008/0252087 | A1 | | 10/2008 | Roll et al. |
| 2012/0091742 | A1 | | 4/2012 | Paare et al. |

FOREIGN PATENT DOCUMENTS

| DE | 2 121 501 | 11/1971 |
| DE | 2 104 797 | 8/1972 |
| DE | 198 35 705 A1 | 2/2000 |
| DE | 10 2007 017 857 A1 | 10/2008 |
| DE | 10 2010 014 999 A1 | 10/2011 |
| JP | 2006 175 988 | 7/2006 |

* cited by examiner

*Primary Examiner* — Dennis H Pedder
(74) *Attorney, Agent, or Firm* — Feiereisen LLC

(57) ABSTRACT

A bumper system for a motor vehicle includes a bumper cross member which is arranged transversely to a travel direction and has two attachment zones for connection to two side rails arranged in parallel relationship to the travel direction. The bumper cross member has a center portion extending between the attachment zones and two end zones to close off the bumper cross member to vehicle sides. A deformation element is arranged behind each of the end zones and constructed to support in the event of a head-on collision with slight overlap the end zone which undergoes a buckling as a result of the head-on collision. At least one belt element at least partly surrounds a circumference of the deformation element and is secured to at least one of the side rails.

27 Claims, 9 Drawing Sheets

BUMPER SYSTEM FOR A MOTOR VEHICLE AND METHOD FOR ENERGY DISSIPATION IN THE EVENT OF A HEAD-ON COLLISION

CROSS-REFERENCES TO RELATED APPLICATIONS

This application claims the priority of German Patent Application, Serial No. 10 2011 053 158.0, filed Aug. 31, 2011, pursuant to 35 U.S.C. 119(a)-(d), the content of which is incorporated herein by reference in its entirety as if fully set forth herein.

BACKGROUND OF THE INVENTION

The present invention relates to a bumper system and to a method for energy dissipation in the event of a head-on collision.

The following discussion of related art is provided to assist the reader in understanding the advantages of the invention, and is not to be construed as an admission that this related art is prior art to this invention.

Vehicles are typically inspected and classified before registration using standardized crash tests to provide information about collision damage and effectiveness of the protection of occupants and pedestrians. The test settings are periodically updated on behalf of the insurers and suited to newest findings of accident research and statistics. According to actual data in the U.S., about 25% of all head-on collisions occur for example with an overlap of less than 30%.

It would be desirable and advantageous to provide an improved bumper system and improved method of dissipating energy in the event of a head-on collision of a motor vehicle with an obstacle at slight overlap to obviate prior art shortcomings and to enhance protection of occupants and thus traffic safety.

SUMMARY OF THE INVENTION

According to one aspect of the present invention, a bumper system for a motor vehicle includes a bumper cross member arranged transversely to a travel direction and having two attachment zones for connection to two longitudinal members or side rails arranged in parallel relationship to the travel direction, with the bumper cross member having a center portion extending between the attachment zones and two end zones to close off the bumper cross member to vehicle sides, a deformation element arranged behind each of the end zones and constructed to support in the event of a head-on collision with slight overlap the end zone which undergoes a buckling as a result of the head-on collision, and at least one belt element at least partly surrounding a circumference of the deformation element and secured to at least one of the side rails.

A bumper system according to the present invention is capable to cover any demands by insurers (for example IIHS and NHTSA) for a head-on collision. These requirements are illustrated and tested in at least two novel test settings in which a vehicle collides with an obstacle, in particular a pole-shaped region, at high speed with slight overlap. Within the scope of the invention, a head-on collision with slight overlap relates to a collision of a vehicle with another vehicle or barrier with an overlap in relation to the width of the vehicle being examined of smaller or equal to 25% or a barrier width of 10 to 25 cm, in particular 15 cm. High speed relates within the scope of the invention to a relative speed of at least 64 km/h between test vehicle and barrier.

A bumper system according to the present invention is thus capable to prevent an inadmissible deep penetration of a pole-shaped barrier into the passenger cabin and a mutual wedging of two vehicles in particular in the area of the front wheel well or rims in the event of a head-on collision against a barrier with slight overlap and in particular at high speed. Still, the bumper system according to the present invention satisfies the requirement for lightweight construction.

According to another advantageous feature of the present invention, the deformation element may be made of ductile, malleable material and arranged between the wheel circumference and an end zone of the bumper cross member. The deformation element is provided to support the end zone of the bumper cross member as it buckles when impacting another vehicle or obstacle with slight overlap so that the vehicle slides off the obstacle to the outside.

In addition, a penetration in the engine compartment is prevented in the event of a head-on collision with a pole-like barrier, and the wheel circumference or the rim may provide an added load path to the vehicle sill. During impact, the vehicle is able in an advantageous manner to execute about the pole-like barrier a pivot movement which can vary in dependence on the impact speed and vehicle weight.

The deformation element is surrounded, at least in part, by a belt element which can be secured, e.g. joined, to the side rail or a flange plate as well as to a coupling element at the forwardmost part of the side rail. The belt element resists the deformation of the deformation element in a direction of the vehicle interior in the event of a head-on collision with slight overlap. As an alternative, the belt element may, for example, also be connected by angle pieces to a connection member. Advantageously, the deformation element is fully surrounded by the belt element, except for a contact zone with the sidewall of the side rail. The belt element embraces the deformation element and maintains its integrity, even when the structure of the deformation element has been significantly deformed and has absorbed respective energy.

During impact and subsequent deformation, the belt element which surrounds the deformation element forms with the deformation element a structure which laterally deflects the body away from the obstacle. In particular, when the deformation element is made of less ductile material, like some plastics, the presence of the belt element which surrounds the deformation element prevents a detachment of possibly forming chips or fragments but rather keeps them packed together and is able to further develop the deflecting and/or intrusion-inhibiting effect.

According to another advantageous feature of the present invention, the deformation element may have an inner wall in flat contact upon a side rail of the vehicle, a trailing transverse wall in spaced-apart relationship to a wheel circumference, and a leading transverse wall in flat contact, at least in part, upon an end zone of the bumper cross member. As an alternative, the deformation element may bear in flat contact upon the wheel circumference. The distance between the trailing transverse wall of the deformation element and the wheel circumference provides added deformation space, thereby providing further weight benefits, especially when light vehicles are involved.

In the event of a collision against a pole-shaped barrier, the end zone of the bumper cross member buckles in a direction of the wheel circumference and initially compresses the deformation element so as to establish a substantially wedge-shaped structure of the deformation element and the end zone of the bumper cross member. When deformation is over, the leading transverse wall of the deformation element assumes a concave, straight or convex shape, depending of the material used and the geometry, especially of the end zones of the bumper cross member.

During impact with slight overlap against another vehicle, the side rail is deformed on the side struck by the obstacle so that a major portion of the impact energy and speed is dissipated.

According to another advantageous feature of the present invention, the deformation element may be made of ductile material such as plastic, especially fiber-reinforced plastic or foam, e.g. EPP (expanded polypropylene), or light metal, e.g. cast aluminum. As the side rail undergoes deformation, the deformation element maintains advantageously an intimate contact with the side rail. This contact can be realized through partial or continuous bond and/or form fit and is promoted or, in fact, rendered possible by the ductile properties.

According to another advantageous feature of the present invention, the deformation element may be formed from a plurality of ribbed or meshed wall portions having at least one end connected to a common base plate so that the wall portions are arranged in parallel relation to the direction of the load introduced via the bumper cross member and able to establish additional load paths.

During a head-on crash with slight overlap against a pole-shaped barrier, energy is initially dissipated only as a result of deformation of the bumper cross member, especially crumpling of the bumper cross member in the area of its horizontal walls in the impact zone. Subsequently, energy is dissipated as the end zone of the bumper cross member crumples in direction of the deformation element and the deformation element then deforms in the direction of the side rail and/or wheel circumference while the distance of the trailing transverse wall of the deformation element to the wheel circumference is maintained. The afore-described wall arrangement as added load paths within the deformation element acts advantageously especially energy-absorbing, when collapsing successively. Thereafter, energy dissipation is realized as a result of the deformation of the deformation element in the direction of the side rail while the distance of the trailing transverse wall of the deformation element to the wheel circumference is reduced. Still remaining impact energy is ultimately fully dissipated by the wheel circumference or rim which forms an additional load path to the vehicle sill which undergoes deformation.

According to another advantageous feature of the present invention, a further belt element may be provided to additionally connect the deformation element with the end zone of the bumper cross member.

According to another advantageous feature of the present invention, the belt element may be made of elastic and tear-resistant material and yet ductile material such as steel strip, steel wire composite or natural or plastic textile fibers, especially hemp or fiber-reinforced polyester. When taut, the belt element limits deformation of the deformation element which bears tightly upon the wheel well on one side and upon the side rail on the outer side in the event of a crash to thereby provide support for the buckling bumper cross member. Advantageously, the belt element is installed in a taut state so that the stabilizing effect on the circumference of the deformation element already develops at the start of deformation of the deformation element.

A wide variety of bumper cross members may find application within the scope of the present invention so long as the bumper cross member has end zones which extend via attachment zones to the coupling elements or side rails. The bumper cross member may be made through roll forming, extruding, or press forming (hot forming) and press hardening. The geometric configuration of the bumper cross member may greatly vary as well.

After press forming or hot forming and press hardening, the bumper cross member has a hat-shaped and/or U-shaped configuration in cross section, with a face plate adjoining in the direction of passenger cell or in the direction of vehicle front.

According to another advantageous feature of the present invention, the bumper cross member has at least some areas which are curved, advantageously over its entire length extent. Variable height profiles and variable cross member widths that are suited to the installation space and stress situation at hand are possible. The provision of a cross member longitudinal axis of variable height in travel transverse direction is even possible.

The bumper cross member may be made of typical materials and material combinations, such as, for example, boron-manganese steels, TRIP multiphase steels, or aluminum alloys, such as wrought aluminum-zinc alloys.

When using lightweight material such as aluminum, the bumper cross member may be made of an extrusion profile and can have first and second hollow chambers, and an intermediate wall which connect the first and second hollow chambers at least in some areas thereof and is configured in parallel relation to a roadway plane.

According to another aspect of the present invention, a method of dissipating energy in the event of a head-on collision of a motor vehicle with an obstacle at slight overlap includes dissipating energy through deformation of a bumper cross member of a bumper system in an impact zone, dissipating energy through buckling of an end zone of the bumper cross member in a direction of a deformation element, dissipating energy through deformation of the deformation element in a direction of a side rail or wheel circumference while maintaining a distance of a trailing transverse wall of the deformation element to the wheel circumference, and dissipating energy through deformation of the deformation element in a direction of the side rail while reducing the distance of the trailing transverse wall of the deformation element to the wheel circumference.

In accordance with the method according to the present invention, part of the energy is directly absorbed by the deformation of the bumper cross member, especially through crumpling in the area of its horizontal walls in an impact zone. A further small part of the energy is absorbed as the end zone of the bumper cross member buckles in the direction of the deformation element. As the bumper cross member buckles, force transfer is thus rendered possible to the deformation element which is positioned there behind. A still further part of the energy is dissipated as a result of a deformation of the deformation element in the direction of the vehicle side rail and/or in the direction of the wheel circumference while initially maintaining a distance between the trailing transverse wall of the deformation element and a wheel circumference. Thereafter, energy is dissipated as a result of deformation of the deformation element in the direction of the wheel circumference while the distance of the trailing transverse wall of the deformation element to the wheel circumference is reduced.

According to another advantageous feature of the present invention, at least one belt element may be provided to at least partly surround the deformation element to absorb additional energy. This added energy dissipation is realized as the belt element undergoes a stretching.

According to another advantageous feature of the present invention, further energy can be absorbed by transferring a still existing residual fraction of impact energy from the deformation element to a vehicle sill via the wheel circumference or rim. This may be relevant when traffic conditions demand test settings beyond those described above.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
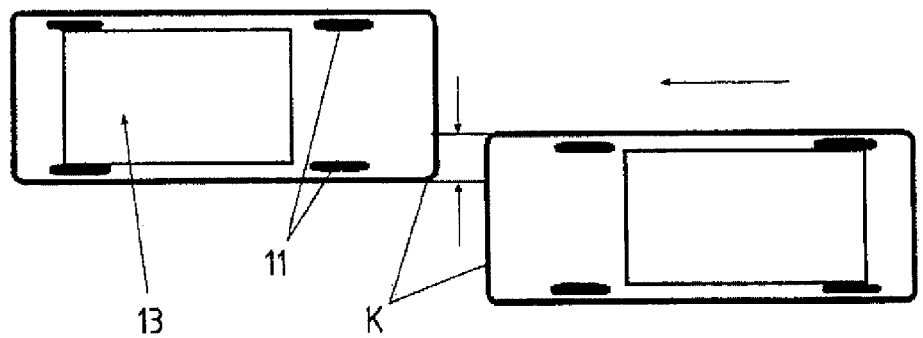
FIG. 1 is a schematic illustration of two vehicles before a head-on collision with slight overlap.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of two vehicles before a head-on collision with slight overlap. The outer contour K of the vehicles is undamaged and the leading wheel circumferences 11 are aligned in vehicle transverse direction. The passenger cell 13 is hinted only and constitutes the area of the vehicle that should neither be penetrated directly by a barrier, such as a pole, nor indirectly by wheels or components of the engine compartment.

Figure 2:
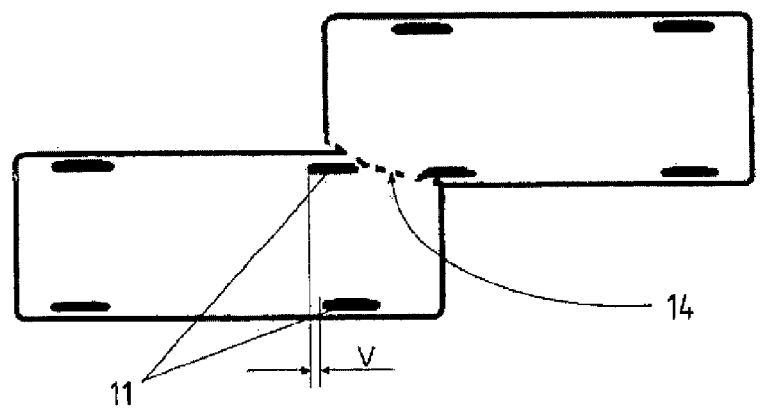
FIG. 2 is a schematic illustration of two vehicles after a head-on collision with slight overlap in accordance with the prior art.

FIG. 2 shows a schematic illustration of a situation directly after an accident in which two vehicles have collided head-on in accordance with the prior art. It is clearly shown that both vehicles are wedged into another after the collision, as indicated by the dashed line of a contact zone 14 of both vehicles. In addition, as can be seen, the front wheels on the impact side are pushed backwards in the direction of the passenger cell by a distance V so that the front wheels are no longer aligned. This is a drawback of conventional bumper systems in such a test setting because of its adverse effect on the leg room in the vehicles and the safety of the passengers.

Figure 3:
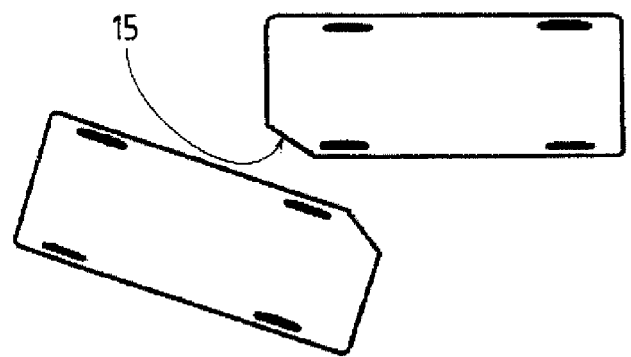
FIG. 3 is a schematic illustration of two vehicles after a head-on collision with slight overlap in accordance with the present invention.

FIG. 3 shows a schematic illustration of two vehicles after a head-on collision with slight overlap, wherein at least one of the vehicles is equipped with a bumper system according to the present invention. As can be seen in FIG. 3, the vehicles have a wedge-shaped vehicle side 15, whereby the indicated chamfer of the outer contour corresponds substantially to the position of the end zone of the bumper cross member 4 after impact. The front wheels of the colliding vehicles remain aligned and there is no wedging of the rims. Overall, a targeted deformation causes a tapered configuration toward the vehicle front side and thus the desired slide-off effect.

Figure 4:
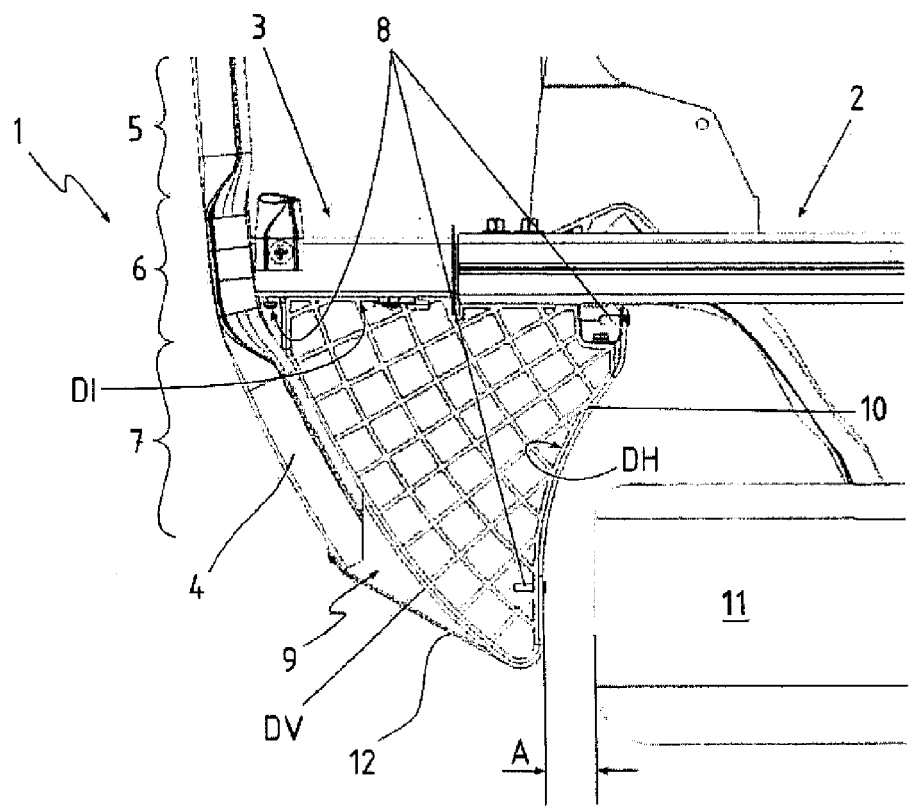
FIG. 4 is a horizontal sectional view of a bumper system in accordance with the present invention.
Figure 4A:
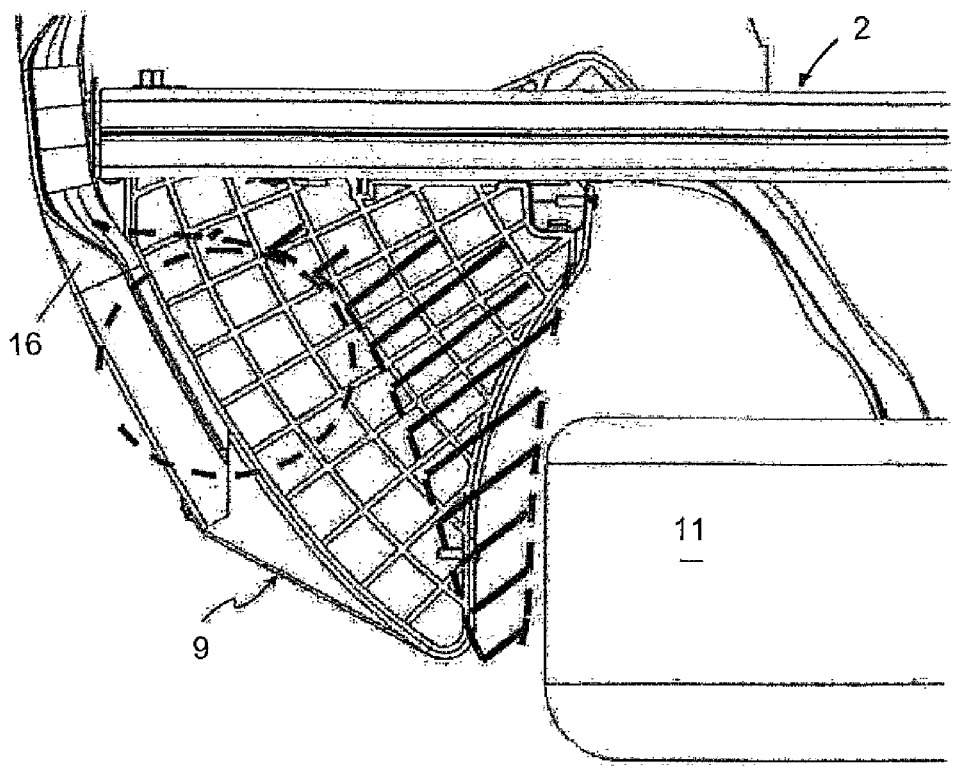
FIG. 4a is a horizontal sectional view of a modified bumper system in accordance with the present invention.

Referring now to FIG. 4, there is shown a horizontal sectional view of a bumper system in accordance with the present invention, generally designated by reference numeral 1 and including a bumper cross member 4 which is connected to a vehicle longitudinal member comprising a side rail 2 and a coupling element 3 adjoining the side rail 2. For convenience and sake of simplicity, the following description is made only in relation to one end of the bumper system, when in fact the two ends of the bumper system are mirror images of one another about an imaginary vertical medial plane which bisects the left from the right of the bumper system. Thus, although the bumper system will be described with respect to only one side, it will be understood that the same components of the bumper system are duplicated on the opposite side.

The bumper cross member 4 has an end zone 7 which extends beyond the coupling element 3 towards the vehicle side and is curved or bent in the direction of the vehicle. Extending between the coupling element 3 and the coupling element on the unillustrated opposite side of the bumper system 1 is a center portion 5 of the bumper cross member 4. A deformation element 9 is arranged between the side rail 2 or coupling element 3 and the bumper cross member 4, and a belt element 10 has one end which is secured to the end face of the side rail 2 of the vehicle by connectors 8, and another end which is secured to the leading end of the coupling element 3 by a connector 8 so that a leading transverse wall DV and a trailing transverse wall DH of the deformation element 9 are substantially embraced about their entire circumference. Attached to the end zone 7 of the bumper cross member 4 and to the outside of the trailing transverse wall DH of the deformation element 9 is a belt element 12. The deformation element 9 is spaced by a constant distance A from the wheel circumference 11.

The deformation element 9 has an inner wall DI which is in substantially flat contact upon the side rail 2 and the coupling element 3 of the vehicle. The trailing transverse wall DH of the deformation element 9 is arranged at a constant distance to the wheel well whereas the leading transverse wall DV is, at least in part, in flat contact with the end zone 7 of the bumper cross member 4. In the event of a collision with slight overlap, a slight deformation in the direction of the front wheel is rendered possible by the distance A of the deformation element 9 to the trailing transverse wall DH in the absence of a contact with the wheel circumference 11.

FIG. 4 further shows the inner structure of the deformation element 9 which is of ribbed or grid-shaped configuration.

Figure 5A:
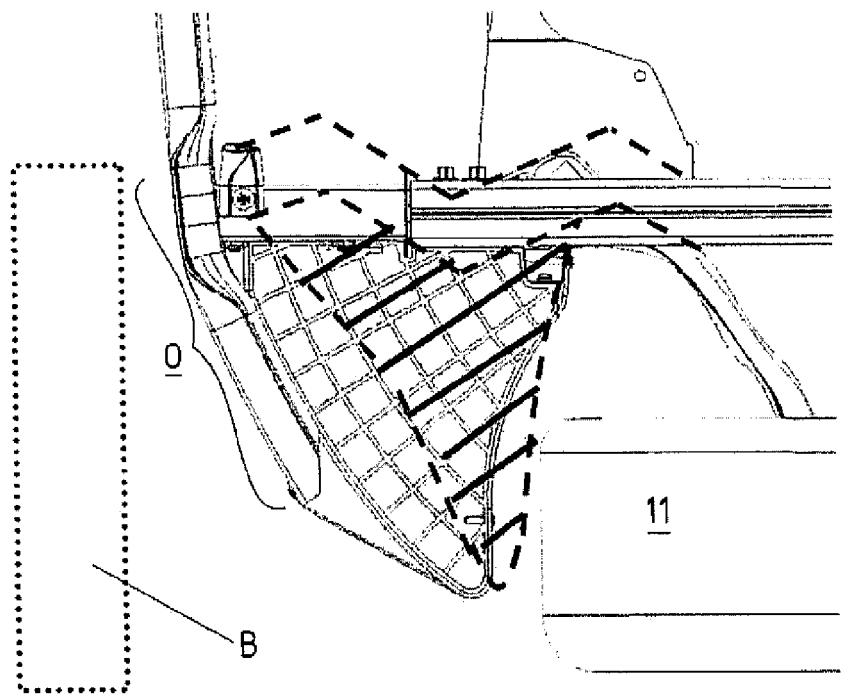
FIGS. 5a, 5b are horizontal sectional views of the bumper system of FIG. 4, depicting relevant parts of the bumper system before and after a head-on collision of two vehicles.
Figure 5B:
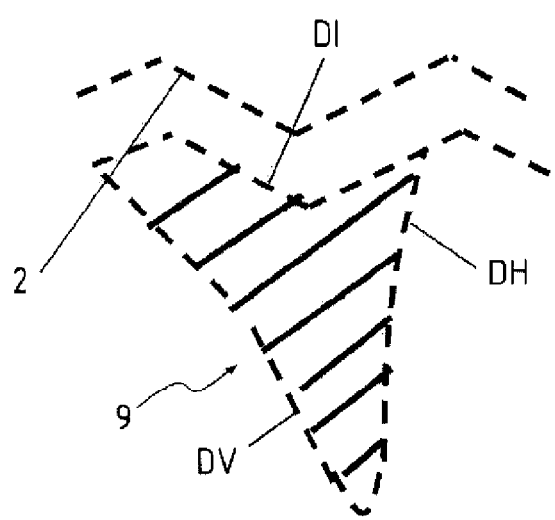

FIGS. 5a and 5b illustrate the deformation pattern of the deformation element 9 before and after a collision with another vehicle with slight overlap. FIG. 5a illustrates the situation before collision by way of continuous lines and superimposed the situation after collision by way of dashed line and hatching. In addition, a barrier B is depicted by dotted line as representing the colliding vehicle. The major part of deformation and the accompanying energy dissipation occurs in the impact zone O which corresponds substantially to the overlap width. As can be seen, only an end zone 7 and an attachment zone of the bumper cross member 4, the side rail 2 as well as the deformation element 9 and the belt elements 10, 12 participate in the energy dissipation, with the deformation element 9 and the belt elements 10, 12 being instrumental for effecting the slide-off effect away from the barrier B.

FIG. 5b depicts only the deformation element 9 and the collapsed side rail 2 and coupling element 3 after the collision. After the end of deformation, the leading transverse wall DV of the deformation element 9 has a plane, wedged-shaped or convex configuration depending on the material used and the initial geometry, in particular curvature of the end zone 7 of the bumper cross member 4. In any case, the deformation of the deformation element 9 in cooperation with the buckled bumper cross member 4 prevents an intrusion of the colliding vehicle into the engine compartment and a wedging within the rims or wheel circumference 11. It can also be seen that the inner wall DI of the deformation element 9 tracks the collapse of the side rail 2 as caused by the collision. This tracking is greatly dependent on the material used and may vary between entirely to minimally, whereby a minimal tracking of the collapse of the side rail 2 manifests itself in widely fluctuating distances which may amount up to several centimeters and in particular in prism-shaped cavities.

Figure 6A:
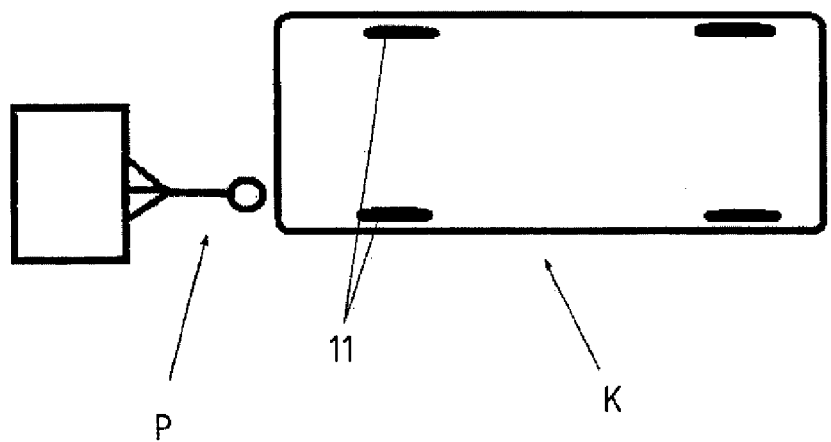
FIG. 6a is a schematic bottom view of a vehicle before a head-on collision against a pole-shaped barrier.
Figure 6B:
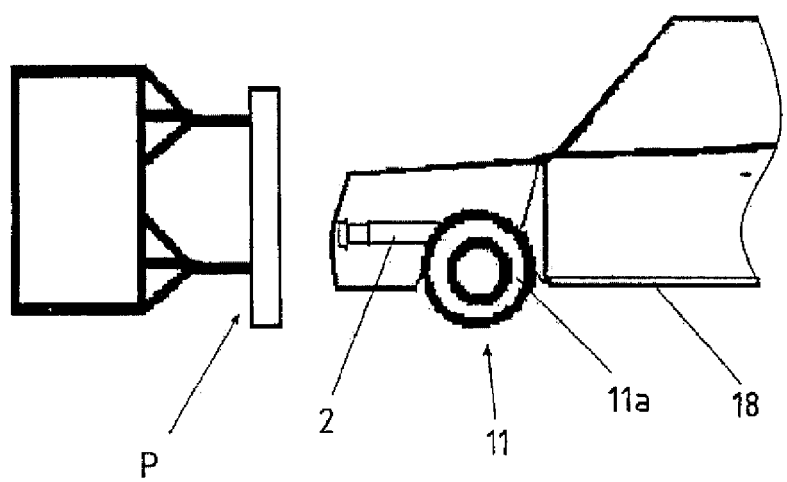
FIG. 6b is a schematic side view of the vehicle before a head-on collision against a pole-shaped barrier.

FIGS. 6a and 6b show schematically a test setting for a head-on collision with slight overlap, whereby the vehicle collides with a pole-shaped barrier P at high speed. The pole has a width between 15 and 25 mm and represents a tree for example. FIG. 6b shows a side view of the vehicle before impact. The vehicle sill 18 is positioned at the bottom edge of the vehicle body between the two wheel circumferences 11 or rims 11a and contributes to the energy dissipation as additional load path via wheel circumference 11 or rim 11a for this test setting. For ease of illustration, deformation element and belt element have been omitted here.

Figure 7A:
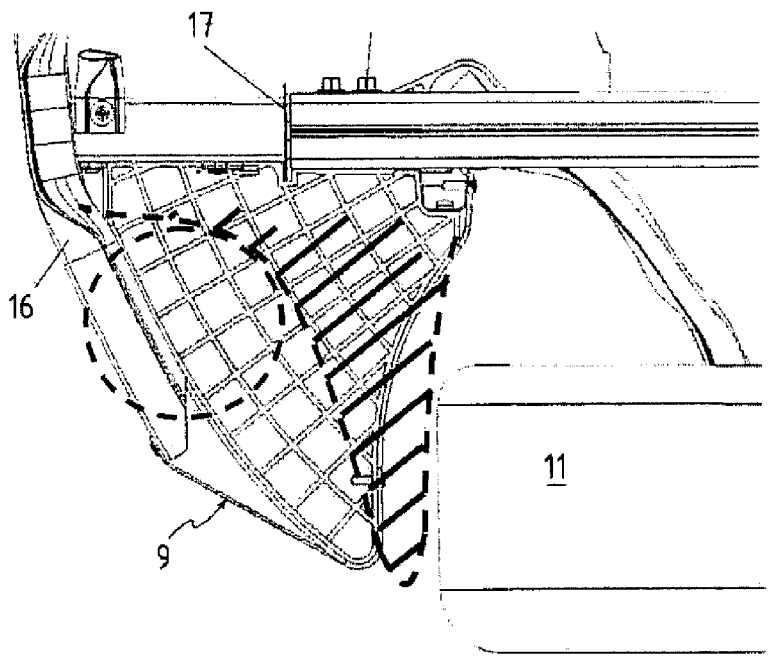
FIG. 7a is a horizontal sectional view of the bumper system, depicting the relevant parts of the bumper system before a head-on collision against a pole-shaped barrier.
Figure 7B:
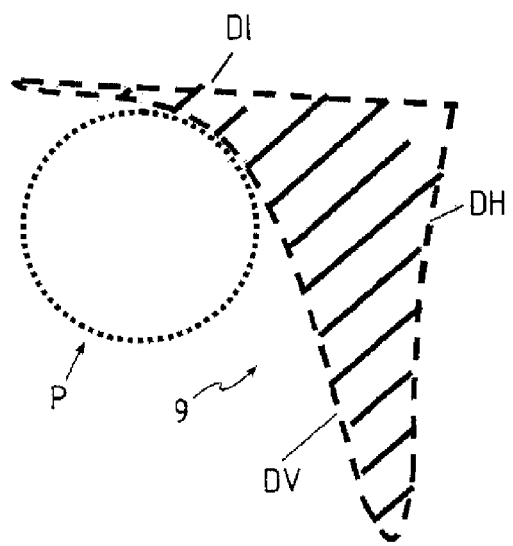
FIG. 7b is a schematic illustration of the bumper system, depicting the relevant parts of the bumper system after a head-on collision against a pole-shaped barrier.

FIGS. 7a and 7b illustrate the deformation pattern of the deformation element 9 when colliding with a pole-shaped barrier P. FIG. 7a illustrates the situation before collision by way of continuous lines and superimposed the situation after collision by way of dashed line and hatching. In addition, pole-shaped barrier P is shown in broken lines. A flange plate 17 extends between side rail 2 and bumper cross member 4 or between the coupling element 3 and the side rail 2 for fastening the two components with one another and for coupling with the inner wall DI of the deformation element 9, in particular through form fit.

FIG. 7b depicts only the deformation element 9 after collision. After the end of deformation, the leading transverse wall DV of the deformation element 9 assumes a concave, straight, or convex shape depending on the material used and the geometry of the end zone 7 of the bumper cross member 4. In any case, the deformation of the deformation element 9 prevents an intrusion of the pole-shaped barrier P into the engine compartment. This is realized by the significant energy-absorbing capability of the deformation element 9 in combination with the additional stabilizing effect of the especially pretensioned belt element 10 which embraces the deformation element 9 and also of the load path established via the wheel circumference 11 or rim 11a to the vehicle sill 18. It is further shown that the collision with slight overlap against the pole-shaped barrier P did not cause a substantial crumpling of the side rail 2 so that energy is dissipated substantially through the end zone 7 of the bumper cross member 4, in particular through its horizontal walls 16, through the deformation element 9 and the belt elements 10, 12. Any remaining energy is absorbed via the additional load path deformation element 9, wheel circumference 11 or rim 11a and vehicle sill 18.

Figure 8A:
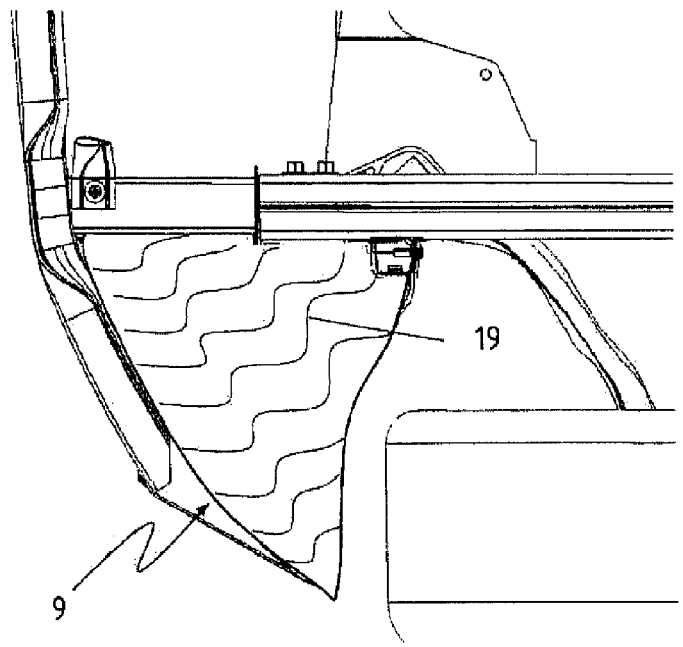
FIGS. 8a-8d show schematic horizontal sectional views of modified deformation elements for a bumper system in accordance with the present invention.
Figure 8B:
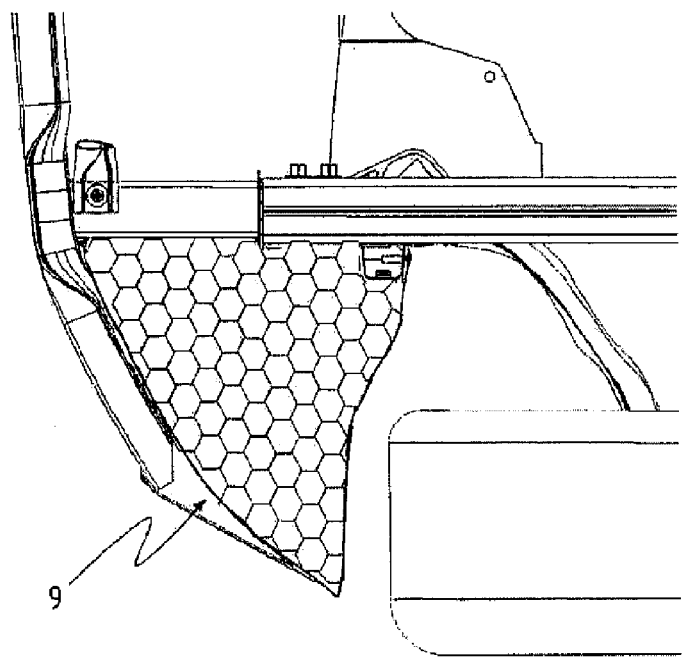

FIGS. 8a-8d show schematic horizontal sectional views of modified deformation elements 9 for a bumper system 1 in accordance with the present invention. In FIG. 8a, the material of the deformation element 9 has inside a wavy structure, whereas FIG. 8b shows a honeycomb structure. Both variants can be produced directly as injection-molded part or through trimming a sandwich panel.

Figure 8C:
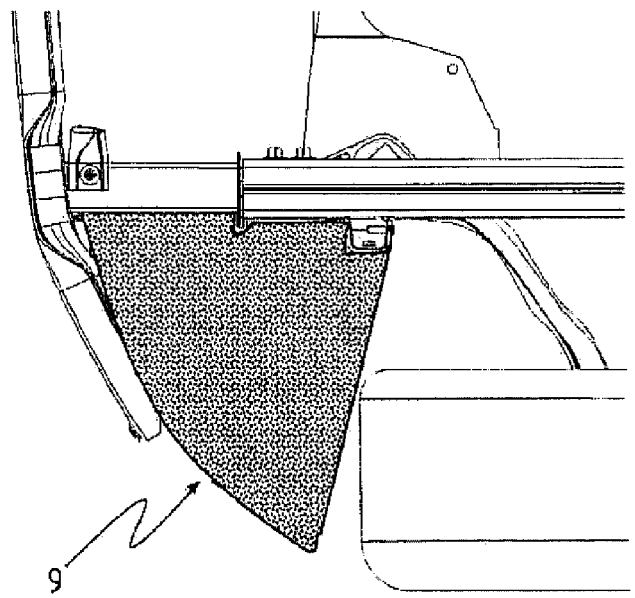

FIG. 8c shows a deformation element 9 which is made of foamed plastic and differs from the deformation elements of FIGS. 8a and 8b by the configuration of the distance A between wheel circumference 11 and trailing transverse wall DH. In FIG. 8c, the distance A has a profile which steadily ascends towards the outer contour of the vehicle.

Figure 8D:
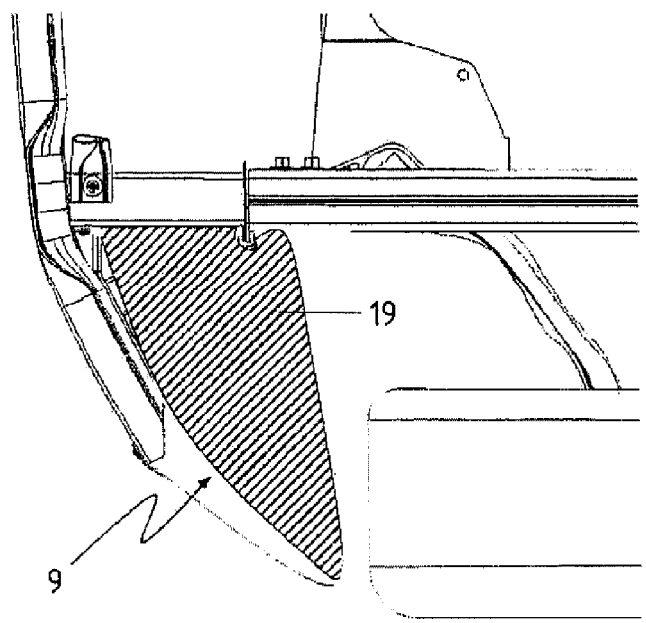
Figure 9D:
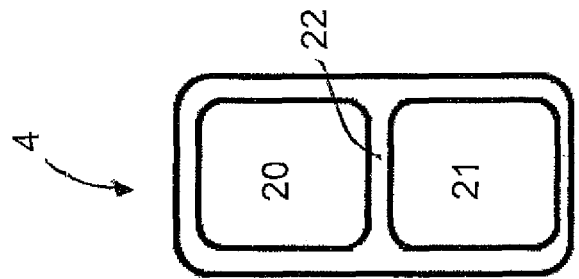
FIGS. 9a-9d show schematic illustrations of exemplary cross sections of a bumper cross member.
Figure 9C:
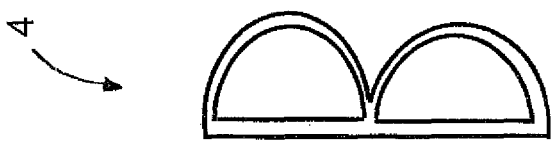
Figure 9B:
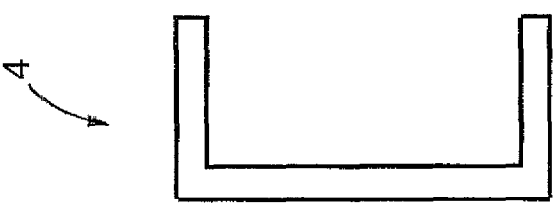
Figure 9A:
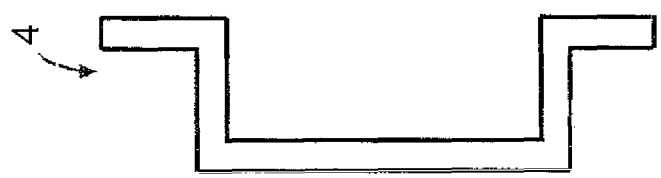

In contrast thereto, the distance A of the deformation element 9 of FIG. 8d between wheel circumference 11 and trailing transverse wall DH extends in opposite direction, and the deformation element of FIG. 8d has inside a grooved structure, with groove walls extending substantially parallel to the load introduction direction and/or perpendicular to the longitudinal extent of the end zones 7 of the bumper cross member 4.

FIGS. 9a-9d show schematic illustrations of exemplary cross sections of a bumper cross member 4. The bumper cross member 4 may have a hat-shaped or U-shaped configuration in cross section and be made through press forming. As an alternative, the bumper cross member 4 may have a B-shaped configuration in cross section and be made through roll forming. The bumper cross member 4 may also be made from an extrusion profile with first and second hollow chambers 20, 21, and an intermediate wall 22 connecting the first and second hollow chambers 20, 21 at least in some areas thereof and configured in parallel relation to a roadway plane.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. A bumper system for a motor vehicle, comprising:
a bumper cross member arranged transversely to a travel direction and having two attachment zones for connection to two longitudinal members arranged in parallel relationship to the travel direction, said bumper cross member having a center portion extending between the attachment zones and two end zones to close off the bumper cross member to vehicle sides;

a deformation element arranged behind each of the end zones and constructed to support in the event of a head-on collision with slight overlap the end zone which undergoes a buckling as a result of the head-on collision; and at least one belt element having ends secured to at least one of the longitudinal members and at least partly surrounding a circumference of the deformation element so as to maintain integrity of the deformation element in the event of the head-on collision as the deformation element is compressed.

2. The bumper system of claim 1, wherein the bumper cross member is connected directly to the longitudinal members at the attachment zones.

3. The bumper system of claim 1, further comprising two coupling elements connecting the bumper cross member to the longitudinal members at the two attachment zones, respectively.

4. The bumper system of claim 1, wherein the deformation element has an inner wall in flat contact upon an adjacent one of the longitudinal members, a trailing transverse wall in spaced-apart relationship to a wheel circumference, and a leading transverse wall in flat contact, at least in part, upon the end zone.

5. The bumper system of claim 4, wherein the deformation element is made of ductile, malleable material and arranged between the wheel circumference and the end zone of the bumper cross member.

6. The bumper system of claim 4, wherein the trailing transverse wall is spaced from the wheel circumference by a constant distance.

7. The bumper system of claim 4, wherein the trailing transverse wall is configured with a concave profile in a direction to the wheel circumference.

8. The bumper system of claim 1, wherein the deformation element is spaced from the wheel circumference by a distance of 10 mm to 50 mm.

9. The bumper system of claim 1, wherein the deformation element is secured to an adjacent one of the longitudinal members through a material joint, form fit, interference fit, or combination thereof either directly or via a flange plate disposed between the bumper cross member and the longitudinal member.

10. The bumper system of claim 1, wherein the deformation element is made of a material having a rib structure, honeycomb structure, wavy structure, grooved structure, or grid structure.

11. The bumper system of claim 1, wherein the deformation element is made of a material selected from the group consisting of plastic, light metal, fiber-reinforced plastic, foam, and cast aluminum.

12. The bumper system of claim 1, wherein the deformation element is formed from a plurality of ribbed or meshed wall portions having at least one end connected to a common base plate, thereby establishing a parallel relation of the wall portions to the direction of a load introduced via the bumper cross member.

13. The bumper system of claim 4, wherein the inner wall of the deformation element is in flat contact upon an end face of the longitudinal member and connected thereto by a material joint, interference fit or form fit.

14. The bumper system of claim 1, wherein the belt element is made of elastic and tear-resistant material.

15. The bumper system of claim 4, wherein the belt element has a first end configured for securement to an end face of the longitudinal member, and a second end which is fastened in such a way that the trailing transverse wall of the deformation element and at least part of the leading transverse wall of the deformation element are surrounded in a formfitting manner.

16. The bumper system of claim 4, wherein the belt element has a first end configured for securement to an end face of the longitudinal member, and a second end configured for securement to a leading end of the longitudinal member, with the leading and trailing transverse walls of the deformation element being surrounded substantially about their entire circumference.

17. The bumper system of claim 4, further comprising a coupling element connecting the bumper cross member to a longitudinal member, respectively, wherein the belt element has a first end configured for securement to an end face of the longitudinal member, and a second end configured for securement to a leading end of the coupling element, with the leading and trailing transverse walls of the deformation element being surrounded substantially about their entire circumference.

18. The bumper system of claim 4, further comprising a further belt element having a first end coupled to the trailing transverse wall of the deformation element, and a second end coupled to an end zone of the bumper cross member, with the leading and trailing transverse walls of the deformation element being surrounded at least in part by the further belt element.

19. The bumper system of claim 3, wherein the belt element is secured under tension with at least one member selected from the group consisting of coupling element, deformation element, longitudinal member, and bumper cross member.

20. The bumper system of claim 1, wherein the bumper cross member has a hat-shaped or U-shaped configuration in cross section and is made through press forming.

21. The bumper system of claim 1, wherein the bumper cross member has a B-shaped configuration in cross section and is made through roll forming.

22. The bumper system of claim 1, wherein the bumper cross member is made from an extrusion profile and has first and second hollow chambers, and an intermediate wall connecting the first and second hollow chambers at least in some areas thereof and configured in parallel relation to a roadway plane.

23. The bumper system of claim 3, wherein the end zones of the bumper cross member are sized to extend beyond the coupling elements in a direction of the vehicle sides and have a curved configuration or are bent in a direction of the motor vehicle.

24. A bumper system for a motor vehicle, comprising:

a bumper cross member arranged transversely to a travel direction and having two attachment zones for connection to two side rails arranged in parallel relationship to the travel direction, said bumper cross member having a center portion extending between the attachment zones and two end zones to close off the bumper cross member to vehicle sides;

a deformation element arranged behind each of the end zones and constructed to support in the event of a head-on collision with slight overlap the end zone which undergoes a buckling as a result of the head-on collision, said deformation element having an inner wall in flat contact upon a side rail, a trailing transverse wall in spaced-apart relationship to a wheel circumference, and a leading transverse wall in flat contact, at least in part, upon the end zone, said the trailing transverse wall being configured with a concave profile in a direction to the wheel circumference; and at least one belt element at least partly surrounding a circumference of the deformation element and secured to at least one of the side rails.

25. A bumper system for a motor vehicle, comprising:

a bumper cross member arranged transversely to a travel direction and having two attachment zones for connection to two side rails arranged in parallel relationship to the travel direction, said bumper cross member having a center portion extending between the attachment zones and two end zones to close off the bumper cross member to vehicle sides;

a deformation element arranged behind each of the end zones and constructed to support in the event of a head-on collision with slight overlap the end zone which undergoes a buckling as a result of the head-on collision, said deformation element having an inner wall in flat contact upon a side rail, a trailing transverse wall in spaced-apart relationship to a wheel circumference, and a leading transverse wall in flat contact, at least in part, upon the end zone; and at least one belt element at least partly surrounding a circumference of the deformation element and secured to at least one of the side rails, said belt element having a first end configured for securement to an end face of the side rail, and a second end configured for securement to a leading end of the side rail, with the leading and trailing transverse walls of the deformation element being surrounded substantially about their entire circumference.

26. A bumper system for a motor vehicle, comprising:

a bumper cross member arranged transversely to a travel direction and having two attachment zones for connection to two side rails arranged in parallel relationship to the travel direction, said bumper cross member having a center portion extending between the attachment zones and two end zones to close off the bumper cross member to vehicle sides;

a deformation element arranged behind each of the end zones and constructed to support in the event of a head-on collision with slight overlap the end zone which undergoes a buckling as a result of the head-on collision, said deformation element having an inner wall in flat contact upon a side rail, a trailing transverse wall in spaced-apart relationship to a wheel circumference, and a leading transverse wall in flat contact, at least in part, upon the end zone;

at least one belt element at least partly surrounding a circumference of the deformation element and secured to at least one of the side rails; and a coupling element connecting the bumper cross member to a side rail, respectively, wherein the belt element has a first end configured for securement to an end face of the side rail, and a second end configured for securement to a leading end of the coupling element, with the leading and trailing transverse walls of the deformation element being surrounded substantially about their entire circumference.

27. A bumper system for a motor vehicle, comprising:

a bumper cross member arranged transversely to a travel direction and having two attachment zones for connection to two side rails arranged in parallel relationship to the travel direction, said bumper cross member having a center portion extending between the attachment zones and two end zones to close off the bumper cross member to vehicle sides;

a deformation element arranged behind each of the end zones and constructed to support in the event of a head-on collision with slight overlap the end zone which undergoes a buckling as a result of the head-on collision, said deformation element having an inner wall in flat contact upon a side rail, a trailing transverse wall in spaced-apart relationship to a wheel circumference, and a leading transverse wall in flat contact, at least in part, upon the end zone;

a first belt element at least partly surrounding a circumference of the deformation element and secured to at least one of the side rails; and a second belt element having a first end coupled to the trailing transverse wall of the deformation element, and a second end coupled to an end zone of the bumper cross member, with the leading and trailing transverse walls of the deformation element being surrounded at least in part by the second belt element.

\* \* \* \* \*